United States Patent
Lin et al.

(10) Patent No.: US 9,881,031 B1
(45) Date of Patent: Jan. 30, 2018

(54) SYSTEM AND METHOD FOR COMBINING DATA SETS

(71) Applicant: CIGNA Intellectual Property, Inc., Philadelphia, PA (US)

(72) Inventors: Jing Lin, Tseung Kwan O (HK); David Fogarty, Old Greenwich, CT (US); Chit Ming Yip, Kwun Tong (HK); Wanyu Liao, Kowloon (HK)

(73) Assignee: Cigna Intellectual Property, Inc., Wilmington, DE (US)

( * ) Notice: Subject to any disclaimer, the term of this patent is extended or adjusted under 35 U.S.C. 154(b) by 272 days.

(21) Appl. No.: 14/627,198

(22) Filed: Feb. 20, 2015

Related U.S. Application Data (60) Provisional application No. 61/945,994, filed on Feb. 28, 2014.

(51) Int. Cl.
 *G06F 15/18* (2006.01)
 *G06F 17/30* (2006.01)
 (Continued)

(52) U.S. Cl.
 CPC ......... *G06F 17/30289* (2013.01); *G06N 5/04* (2013.01); *G06N 99/005* (2013.01)

(58) Field of Classification Search
 CPC combination set(s) only.
 See application file for complete search history.

(56) References Cited

U.S. PATENT DOCUMENTS

| 8,802,375 | B2 * | 8/2014 | Sampson | ........... | G01N 33/6854 435/7.1 |
|---|---|---|---|---|---|
| 2011/0071043 | A1 * | 3/2011 | Sampson | ........... | G01N 33/6854 506/9 |

(Continued)

OTHER PUBLICATIONS

Extracting clinical information from free-text of pathology and operation notes via Chinese natural language processing Qiang Zeng; Xiaoyan Zhang; Zuofeng Li; Lei Liu; Weide Zhang 2010 IEEE International Conference on Bioinformatics and Biomedicine Workshops (BIBMW) Year: 2010 pp. 593-597 IEEE Conference Publications.*

(Continued)

*Primary Examiner* — Michael B Holmes
(74) *Attorney, Agent, or Firm* — Morgan, Lewis & Bockius, LLP (57) ABSTRACT

Embodiments of the invention involve receiving a first set of data describing one or more first observations and a second set of data describing one or more second observations. The first set of data comprises at least two types of data and the second set of data comprises at least two types of data. At least one of the two types of data in the first data set are common with at least one of the two types of data in the second data set. The common types of data comprise common data to the first and second sets of data. The types of data that are not common comprise exclusive data for each of the first and second sets of data. A first multiple regression model is developed for the first data set. The common data for the first data set are set as independent variables and the exclusive data for the first data set are set as dependent variables. A second multiple regression model is developed for the second data set. The common data for the second data set are set as independent variables and the exclusive data for the second data set are set as dependent variables. Prediction results of the first and second multiple regression models are received. Based on the prediction results, at least some of the one or more first observations and the one or more second observations are classified as reasonable observations, which are well-predicted observations. At least some of the one or more first observations and the one or more second observations are classified as outlier observations, which are not classified as well-predicted observations. The outlier observations are removed. The reasonable observations are assigned into intervals for each of the types (Continued)

of data. Based on the assignment, the observations are merged to create a third data set.

3 Claims, 4 Drawing Sheets

(51) Int. Cl.
*G06N 99/00* (2010.01)
*G06N 5/04* (2006.01)

(56) References Cited

U.S. PATENT DOCUMENTS

| | | | |
|---|---|---|---|
| 2014/0236491 A1* | 8/2014 | Katayev | G06F 19/34 702/19 |
| 2015/0149248 A1* | 5/2015 | Mizuta | G06Q 30/0241 705/7.31 |
| 2017/0219578 A1* | 8/2017 | Getts | G01N 33/558 |

OTHER PUBLICATIONS

Efficient sparse least squares support vector machines for regression Gangquan Si; Jianquan Shi; Zhang Guo; Weili Zhao Proceedings of the 33rd Chinese Control Conference Year: 2014 pp. 5173-5178 IEEE Conference Publications.*

Selection of stable features for modeling 4-D affective space from EEG recording Rakib Al-Fahad; Mohammed Yeasin; A S M Iftekhar Anam; Bahareh Elahian 2017 International Joint Conference on Neural Networks (IJCNN) Year: 2017 pp. 1202-1209 IEEE Conference Publications.*

Inference of gene regulatory networks by integrating gene expressions and genetic perturbations Dong-Chul Kim; Chunyu Liu; Xiaoyong Wu; Baoju Zhang; Jean Gao 2013 IEEE International Conference on Bioinformatics and Biomedicine Year: 2013 pp. 182-187 IEEE Conference Publications.*

* cited by examiner

SYSTEM AND METHOD FOR COMBINING DATA SETS

CROSS REFERENCE TO RELATED APPLICATIONS

This application claims priority to U.S. Provisional Patent Application No. 61/945,994 filed Feb. 28, 2014, which application is hereby incorporated by reference in its entirety.

FIELD OF THE INVENTION

The invention relates to fusing of two data sets by removing records in the set that are unmatched.

BRIEF SUMMARY OF EMBODIMENTS OF THE INVENTION

Embodiments of the invention involve receiving a first set of data describing one or more first observations and a second set of data describing one or more second observations. The first set of data comprises at least two types of data and the second set of data comprises at least two types of data. At least one of the two types of data in the first data set are common with at least one of the two types of data in the second data set. The common types of data comprise common data to the first and second sets of data. The types of data that are not common comprise exclusive data for each of the first and second sets of data. A first multiple regression model is developed for the first data set. The common data for the first data set are set as independent variables and the exclusive data for the first data set are set as dependent variables. A second multiple regression model is developed for the second data set. The common data for the second data set are set as independent variables and the exclusive data for the second data set are set as dependent variables. Prediction results of the first and second multiple regression models are received. Based on the prediction results, at least some of the one or more first observations and the one or more second observations are classified as reasonable observations, which are well-predicted observations. At least some of the one or more first observations and the one or more second observations are classified as outlier observations, which are not classified as well-predicted observations. The outlier observations are removed. The reasonable observations are assigned into intervals for each of the types of data. Based on the assignment, the observations are merged to create a third data set.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DESCRIPTION OF THE EMBODIMENTS

Disclosed herein is a data fusion methodology that is used to enrich an existing dataset of information that can be obtained from either an internal or external data sources without a match key. The methodology relies on the common variables between two sets of data (e.g., dataset A and dataset B) as a bridge to transmit the information from one dataset to another. Linear regression may be used to ensure the explanation power of common variables on each record. Using common information as independent variables to predict exclusive information as dependent variables on both dataset A and B, it can be determined whether the records within two datasets can be well-integrated. In general, not all observations of exclusive information can be well predicted by the observations of common information. The well predicted observations are referred to as "reasonable" and others "outlier". After removing the outliers, the common variables become a bridge to fuse two sets by bring the whole record within dataset B to dataset A through common variables. A cluster analysis may be included to optimize the matching process. Also, the error may be eliminated by the propensity score to remove the records that are not perfectly fused.

Currently, a large amount of data is generated in connection with and related to the behavior of consumers, as well as activity undertaken on a variety of different platforms. On the one hand, because data can be recorded from thousands of difference sources, better information is available for each individual consumer. However, as a result of the many sources of data, a great deal of effort is required to collect enough data such that it is useable for companies. Moreover, as data becomes more and more important for all businesses, companies highly value their data and are not readily willing to divulge it to others. These factors, combined with the growing movement of protecting privacy, it is becoming harder for a company to obtain data from external channels.

Data is available from different sources, including government statistic bureaus, the databases of business partners, and external data providers. These sets of data contain different types of information relating to customers. If the data is generated from one source, a unique key (the term "key" refers to a unique identifier to connect different pieces of information for a person) is usually provided to link different sets of data, such as the policy number for insurance data or account number for bank data. Unfortunately, due the fact that to the data comes from different sources, these sets of data do not have a unique key to identify customers. In the worst case scenario, these sets of data are representative of completely different groups of people. For example, data set A contains the demographic information of a group of people living in a middle-class community within New York, while data set B contains the bank information also for a middle-class group of people but not the same group. What is desired is a more complete data set containing both the demographic and bank information for each customer. To date, there has been no effective method to directly link these sets of data. The present invention provides a system and method for solving this problem.

Different from other methodologies, the algorithm described herein not only merges the sets of data logically and with very rigorous statistical analysis, but also maintains the relation between data fields through maintaining the correlation within each set of data. By relying on the common variables between two sets of data as a bridge, information can be transmitted from one dataset to another by regression and clustering to optimize the matching process and eliminate the error through a propensity score removing approach.

Thus, with reference to the example raised above, a set of data can be generated that contains both demographic and bank information for each person. The bank information cannot be exactly the same as the demographic information for each specific person. However, by using statistical analysis, the error of the bank information is limited to a reasonable and acceptable range. This methodology allows a company to leverage the power of information through unlocking the maximum value of different data sources and to enjoy the benefits of the vast amount of data that is available.

Referring now to embodiments of the invention in more detail, with the current availability of large amounts of data, organizations have created and stored more transactional data in digital form through multiple platforms and sources. Organizations are able to collect more accurate and detailed information on many aspects of an individual's daily life (e.g., from products purchased to sick days, from preferences to behavior patterns). Organizations can take advantage of the variety of available data and use it to boost performance (e.g., in the marketing context). Data has been leveraged by virtually every industry and business function and plays an important role in production, alongside labor and capital decisions. More and more, companies are using data collection and analysis to drive business insights to develop better strategies and make better decisions. The use of data has become a key basis of competition for companies by leveraging data-driven strategies into innovations that can satisfy customers better by fully understanding their needs.

While many industries benefit from the use of available data, some industries are predicted to obtain greater impacts and gains from having such data available, such as the insurance industry.

However, it is difficult for insurance companies to collect the detailed and up-to-date information they need, since they can only have access to very limited information from several areas (e.g., what kinds of policy/plan customers choose, the hospitals they visit, how much money they spend, or what kinds of diseases they have). Meanwhile, a person's lifestyle, preference and consuming behavior, daily diet and activities are the factors that actually impact a person's health. Unfortunately, insurance companies cannot alone generate all the information that is necessary to conduct a complete analysis. Many external partners and information providers are able to share additional data while complying with local regulation or privacy protection laws. Although companies could obtain more information from external organizations, there is no easy way to combine internal data with external data—i.e., privacy regulations prohibit use of a match key (i.e., a personal identifier) between the sets of data. For example, to identify a person whose data is included within that of a bank or insurance company, the person's policy number or account number may serve as a unique key to link data from different datasets. However, in order to link datasets generated from both internal and external platforms, such a unique key does not exist. Identifiers such as social security numbers are highly confidential cannot be shared between different organizations.

Existing methodologies have attempted to integrate information from different data sources by relying on one information source and then simulating the additional data field from another source one variable at a time. Such methodologies ensure a relationship between two datasets, but result in a loss of correlation within the second dataset.

The methodology described herein involves a fusion algorithm that enriches data by using common variables as a bridge to link two sets of data and then borrow the whole record from the second dataset. Clustering and propensity modeling are included to eliminate the error and reduce potential mismatching. In this way, companies are able to enjoy the benefit of data from different sources and unlock the informational power of available data.

The methodology described herein does not require a unique key to map two sets of data, as is used in existing solutions. In addition, it maintains the statistical characteristics and distribution within each dataset and between two datasets through combining the entire record of two datasets directly instead of simulating variables one by one. Thus, the methodology involves transmission and fusion by way of a bridge created by common variables between two sets of data.

By way of specific example, there are two data sets A and B. A has $N_1$ observations (e.g., individuals) and contains m types of information denoted by $x_1, x_2, \ldots x_m$. B has $N_2$ observations and contains n types of information denoted by $y_1, y_2, \ldots y_n$. Further, there are p types of information in common in both data sets A and B, e.g., age, gender, education level, etc.

To better classify the information, the types of information in data set A is split into two parts (and the order may be rearranged): exclusive information $x_1, x_2, \ldots x_{m-p}$ and common information $x_{m-p+1}, x_{m-p+2}, \ldots x_m$. The same is done to data set B: exclusive information $y_1, y, \ldots y_{n-p}$ and common information $y_{n-p+1}, y_{n-p+2}, \ldots y_n$. Here, common information means the data fields exist in both datasets, and exclusive information represents the data fields only included in one dataset. Tables 1 and 2 are illustrative.

TABLE 1

| | Data set A | | | | | | |
|---|---|---|---|---|---|---|---|
| | Exclusive information | | | | Common information | | |
| observation | $x_1$ | $x_2$ | ... | $x_{m-p}$ | $x_{m-p+1}$ | $x_{m-p+2}$ | ... | $x_m$ |
| $A_1$ | | | | | | | |
| $A_2$ | | | | | | | |
| ... | | | | | | | |
| $A_{N_1}$ | | | | | | | |

TABLE 2

| | Data set B | | | | | | |
|---|---|---|---|---|---|---|---|
| | Exclusive information | | | | Common information | | |
| observation | $y_1$ | $y_2$ | ... | $y_{n-p}$ | $y_{n-p+1}$ | $y_{n-p+2}$ | ... | $y_n$ |
| $B_1$ | | | | | | | |
| $B_2$ | | | | | | | |
| ... | | | | | | | |
| $B_{N_2}$ | | | | | | | |

In data set A, regression is used to analyze which observations of the exclusive information can be well interpreted by the observations of the common information, namely $x_{m-p+1}, x_{m-p+2}, \ldots x_m$. In other words, common information is used as independent variables to predict exclusive information as dependent variables. A similar regression is performed for data set B. One exemplary regression model and criteria for prediction checking that can be used in connection with the present invention is described in Appendix A. However, it will be understood by those skilled in the art that other models can be used.

In general, not all observations of exclusive information can be well-predicted by the observations of common information. Well-predicted observations are called "reasonable" and others are called "outlier". Assuming that there are $n_1$ reasonable observations in data set A and $n_2$ reasonable observations in data set B. The observations in data set A are split into two parts (and the order possibly re-arranged): reasonable observations $A_1, A_2, \ldots A_{n_1}$ and outlier observations $A_{n_1+1}, A_{n_1+2}, \ldots A_{N_1}$. The same is done for data set B: reasonable observations $B_1, B_2, \ldots B_{n_2}$ and outlier observations $B_{n_2+1}, B_{n_2+2}, \ldots B_{N_2}$. Tables 3 and 4 are illustrative.

TABLE 3

Data set A

| | | Exclusive information | | | | Common information | | | |
|---|---|---|---|---|---|---|---|---|---|
| | observation | $x_1$ | $x_2$ | ... | $x_{m-p}$ | $x_{m-p+1}$ | $x_{m-p+2}$ | ... | $x_m$ |
| reasonable | $A_1$ | | | | | | | | |
| | $A_2$ | | | | | | | | |
| | ... | | | | | | | | |
| | $A_{n_1}$ | | | | | | | | |
| outlier | $A_{n_1+1}$ | | | | | | | | |
| | $A_{n_1+2}$ | | | | | | | | |
| | ... | | | | | | | | |
| | $A_{N_1}$ | | | | | | | | |

TABLE 4

Data set B

| | | Exclusive information | | | | Common information | | | |
|---|---|---|---|---|---|---|---|---|---|
| | observation | $y_1$ | $y_2$ | ... | $y_{n-p}$ | $y_{n-p+1}$ | $y_{n-p+2}$ | ... | $y_n$ |
| reasonable | $B_1$ | | | | | | | | |
| | $B_2$ | | | | | | | | |
| | ... | | | | | | | | |
| | $B_{n_2}$ | | | | | | | | |
| outlier | $B_{n_2+1}$ | | | | | | | | |
| | $B_{n_2+2}$ | | | | | | | | |
| | ... | | | | | | | | |
| | $B_{N_2}$ | | | | | | | | |

The reasonable observations are now described in more detail. The values of common information $x_i$ (i ranges from m−p+1 to m) are classified to several intervals. The number of intervals of $x_i$ is split into by $s(x_i)$ and the $j_{th}$ interval by $(x_i)_j$. The values of $x_i$ have been split into $s(x_i)$ intervals: $(x_i)_1, r(x_i)_2, \ldots r(x_i)_{s(x_i)}$. Suppose that, $A_1$'s $x_{m-p+1}$ value belongs to $r(x_{m-p+1})_3$, $A_1$'s $x_{m-p+2}$ value belongs to $r(x_{m-p+2})_1, \ldots A_1$'s $x_m$ value belongs to $r(x_m)_5$, then the observation $A_1$ uniquely belongs to a combination of intervals $(r(x_{m-p+1})_3, r(x_{m-p+2})_1, \ldots r(x_m)_5)$. Every observation uniquely belongs to one combination of intervals. Table 5 is illustrative.

TABLE 5

| $x_{m-p+1}$ | ... | $x_{m-1}$ | $x_m$ | observations |
|---|---|---|---|---|
| $r(x_{m-p-1})_1$ | | $r(x_{m-1})_1$ | $r(x_m)_1$ | contains the observations belonging to the combination of interval: $r(x_{m-p+1})_1, \ldots r(x_{m-1})_1, r(x_m)_1$ |
| | | | $r(x_m)_2$ | contains the observations belonging to the combination of interval: $r(x_{m-p+1})_1, \ldots r(x_{m-1})_1, r(x_m)_2$ |
| | | | ... | ... |
| | | | $r(x_m)_{s(x_m)}$ | contains the observations belonging to the combination of interval: $r(x_{m-p+1})_1, \ldots r(x_{m-1})_1, r(x_m)_{s(x_m)}$ |
| | | $r(x_{m-1})_2$ | $r(x_m)_1$ | ... |
| | | | $r(x_m)_2$ | ... |
| | | | ... | ... |
| | | | $r(x_m)_{s(x_m)}$ | ... |
| | | ... | $r(x_m)_1$ | ... |
| | | | $r(x_m)_2$ | ... |
| | | | ... | ... |
| | | | $r(x_m)_{s(x_m)}$ | ... |
| | | $r(x_{m-1})_{s(x_{m-1})}$ | $r(x_m)_1$ | ... |
| | | | $r(x_m)_2$ | ... |
| | | | ... | ... |
| | | | $r(x_m)_{s(x_m)}$ | ... |
| ... | ... | $r(x_{m-1})_1$ | $r(x_m)_1$ | ... |
| | | | $r(x_m)_2$ | ... |
| | | | ... | ... |
| | | | $r(x_m)_{s(x_m)}$ | ... |
| | | $r(x_{m-1})_2$ | $r(x_m)_1$ | ... |
| | | | $r(x_m)_2$ | ... |
| | | | ... | ... |
| | | | $r(x_m)_{s(x_m)}$ | ... |
| | | ... | $r(x_m)_1$ | ... |
| | | | $r(x_m)_2$ | ... |
| | | | ... | ... |
| | | | $r(x_m)_{s(x_m)}$ | ... |
| | | $r(x_{m-1})_{s(x_{m-1})}$ | $r(x_m)_1$ | ... |
| | | | $r(x_m)_2$ | ... |
| | | | ... | ... |
| | | | $r(x_m)_{s(x_m)}$ | ... |
| $r(x_{m-p-1})_{s(x_{m-p-1})}$ | ... | $r(x_{m-1})_1$ | $r(x_m)_1$ | ... |
| | | | $r(x_m)_2$ | ... |
| | | | ... | ... |
| | | | $r(x_m)_{s(x_m)}$ | ... |
| | | $r(x_{m-1})_2$ | $r(x_m)_1$ | ... |
| | | | $r(x_m)_2$ | ... |
| | | | ... | ... |
| | | | $r(x_m)_{s(x_m)}$ | ... |
| | | ... | $r(x_m)_1$ | ... |
| | | | $r(x_m)_2$ | ... |
| | | | ... | ... |
| | | | $r(x_m)_{s(x_m)}$ | ... |
| | | $r(x_{m-1})_{s(x_{m-1})}$ | $r(x_m)_1$ | ... |
| | | | $r(x_m)_2$ | ... |
| | | | ... | ... |
| | | | $r(x_m)_{s(x_m)}$ | ... |

The same splitting of the values of common information in data set B is performed and a similar table to the above is obtained. The structure of this table is the same as the above and, thus, not shown.

A combination of intervals is arbitrarily picked in data set A, e.g., $r(x_{m-p+1})_1, \ldots (x_{m-1})_1, r(x_m)_1$. Then, the corresponding combination of interval in data set B is $r(y_{n-p+1})_1, \ldots r(y_{n-1})_1, r(y_n)_1$ identified. The number of observations belonging to $r(x_{m-p+1})_1, \ldots (x_{m-1})_1, r(x_m)_1$ is $k_1$, and the number of observations belonging to $r(y_{n-p+1})_1, \ldots r(y_{n-1})_1, r(y_n)_1$ is $k_2$. Then, one of the following cases will occur.

Case 1: $k_1 = k_2$

In this case, the two groups of observations are arbitrarily matched. For example, if only $A_1$, $A_2$, $A_3$ belong to $r(x_{m-p+1})_1, \ldots (x_{m-1})_1, r(x_m)_1$ and only $B_1, B_2, B_3$ belong to $r(y_{n-p+i})_1, \ldots r(y_{n-1})_1, r(y_n)_1$ then one of the possible outcome could be $A_1B_2, A_2B_3, A_3B_1$.

Case 2: $k_1 > k_2$

In this case, all the $k_2$ observations in data set B are arbitrarily assigned to $k_2$ observation in data set A, and then $k_1-k_2$ (with replacement) observations are arbitrarily picked from the $k_2$ observations in data set B and assigned to the remaining $k_1-k_2$ observations in data set A. The intervals should be split in other ways to avoid the case where $k_2=0$ but, if this case occurs, then a special value can be assigned that indicates missing or a bootstrapping technique can be used to fill the values, depending on the actual business needs. For example, if only $A_1, A_2, A_3, A_4, A_5, A_6$ belong to $r(x_{m-p+1})_1, \ldots (x_{m-1})_1, r(x_m)_1$ and only $B_1, B_2, B_3$ belong to $r(y_{n-p+1})_1, \ldots r(y_{n-1})_1, r(y_n)_1$, then one of the possible outcome could be $A_1B_2, A_2B_3, A_3B_1, A_4B_1, A_5B_1, A_6B_3$.

Case 3: $k_1 < k_2$

In this case, $k_1$ (without replacement) observations in data set B are arbitrarily picked and assigned to all the $k_1$ observations in data set A. Then, the remaining observations in data set B are dropped. For example, if only $A_1, A_2$ belong to $r(x_{m-p+1})_1, \ldots r(x_{m-1})_1, r(x_m)_1$ and only $B_1, B_2, B_3$ belong to $r(y_{n-p+1})_1, \ldots r(y_{n-1})_1, r(y_n)_1$ then one of the possible outcome could be $A_1B_2, A_2B_3$.

Repeating the above steps through all the combinations of intervals, all the reasonable observations in data set A and B have been merged. The new merged data set is C, and data set C has the structure shown in Table 6.

TABLE 6

| Data set C | | | |
|---|---|---|---|
| information from A | common information | information from B | |
| $x_1$ $x_2$ ... $x_{m-p}$ | $x_{m-p+1}$ $x_{m-p+2}$ ... $x_m$ | $y_{n-p+1}$ $y_{n-p+2}$ ... $y_n$ | |
| $C_1$ | | | |
| $C_2$ | | | |
| ... | | | |
| $C_{n_1}$ | | | |

Typically, there are two main purposes to integrate information and combine two or more datasets. The first is to enrich companies' data pools to have more complete and solid information, which enhances the process of developing strategies and making decisions through data analysis. Second, a sales driven organization wants to know more about product consumption so that it can identify customers to target for potential sales. Described herein is an internal evaluation of whether the integration of the two sets of data described above has an acceptable measure of error. Also described is an external evaluation which tests whether the predictive power of the new integrated information is increased as compared to that without the fusion process described herein.

In connection with internal validation, it is ensured that the new dataset generated through fusing two sets of data without a unique match key has the characteristic of each record well-represented. This means that, if the first dataset includes a person's demographic information, once the financial transaction data is transmitted and fused in the second dataset, according to the methods described herein, the transaction data is similar to the behavior that is actually observed with regard to that person. In other words, the new data assigned to the record in the first dataset should well-represent the characteristics of that record.

In order to observe whether the information on the entire data meaningfully describes an individual's characteristic with regard to, e.g., behavior patterns and other information, cluster analysis is performed. This methodology involves grouping a set of objects in such a way that objects in the same group (called a cluster) are more similar in some or all senses to each other than to those in other groups (clusters). Cluster analysis is a common technique for statistical data analysis in pattern recognition and information retrieval.

If the algorithm for data fusion is effective, then once cluster analysis is used to group objects in the integrated dataset with variables in the first dataset A to different clusters, each cluster should include a specific group of objects sharing a similar behavior pattern, even on those variables that come from the second dataset B. Therefore, if the difference between each cluster is large enough on the variables from the second dataset B, it can be determined that the pattern on each object is well represented by its own data field and the variables from set A share the same pattern with the variables from set B.

Next, evaluation is performed by reviewing the variation of fused variables between clusters. Data in the first dataset A is relied upon to generate several clusters j from 1 to k. Then, through calculating the average value (mean) for each variable within second dataset B, a table is obtained (Table 7).

TABLE 7

| Cluster | Mean($x^{m+1}$) | ... | Mean($x^{m+n}$) |
|---|---|---|---|
| Cluster 1 | $x_1^{m+1}$ | ... | $x_1^{m+n}$ |
| Cluster 2 | $x_2^{m+1}$ | ... | $x_2^{m+n}$ |
| ... | $x_3^{m+1}$ | ... | $x_3^{m+n}$ |
| Cluster k | $x_k^{m+1}$ | ... | $x_k^{m+n}$ |
| Total | $\overline{x^{m+1}}$ | ... | $\overline{x^{m+n}}$ |

Here, variables from $x^{m+1}$ to $x^{m+n}$ are those in the second dataset, $x_j^{m+i}$ is the value of mean within each cluster j, and $\overline{x^{m+i}}$ is the value of mean on each variable across all clusters.

Since observations between clusters should be quite different from each other, if the mean of each cluster is compared, the greater the difference between each value on the fused value coming from the second dataset B, the better fusion results have been obtained. Therefore, the variation between all the clusters is used to evaluate the fusion effect using equation $$\sum_{i=1}^{n}\sum_{j=1}^{k}\left(x_j^{m+i} - \overline{x^{m+i}}\right)$$

The above equation indicates the difference of fused variables between clusters. The more effective the fusion algorithm is, the bigger value it will have. In extreme case, when dataset A and dataset B are fused randomly, the value obtained from above equation will be close to zero.

The foregoing methodology can be tested by changing the number of common variables between dataset A and dataset B. It has been determined that, the more common variables the datasets have, the more effective the data transmission and fusion algorithm will be. This conclusion is validated by both internal validation and external validation.

Figure 1:
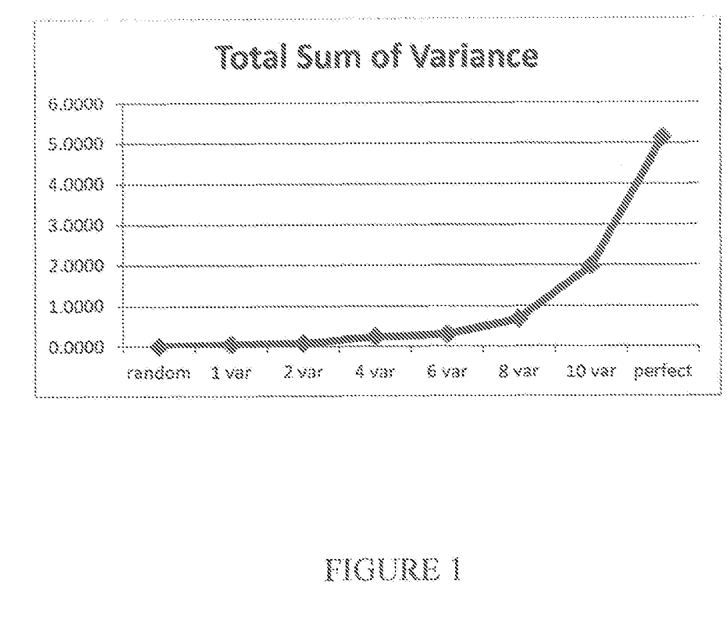
FIG. 1 is a table illustrating an internal valuation technique.

Internal valuation is described with reference to Table 8 and FIG. 1.

TABLE 8

|  | # of common variables | Total Sum of Variance (adjusted by # of fused variables) |
|---|---|---|
| random fused | random | 0.0130 |
| Number of | 1 common variables | 0.0480 |
| common | 2 common variables | 0.0761 |
| variables fused | 4 common variables | 0.2400 |
|  | 6 common variables | 0.3010 |
|  | 8 common variables | 0.6756 |
|  | 10 common variables | 1.9807 |
| Perfect fused | All variables are common ones | 5.1338 |

As described above, if dataset A and dataset B are fused randomly, the value will be close to zero. With the algorithm described herein, the fused variables well-represent the pattern within each cluster, and the effect increases by increasing of the number of common variables until a perfect integration is achieved. In the ideal case, all variables in dataset A and dataset B are common variables; the variation upon all clusters will be equal to 5.1338 which is the best scenario that can be achieved.

External validation is described with reference to Table 9. In the insurance and finance industries, one benefit of using the data fusion techniques described herein is to enrich the data more accurately and efficiently to allow for targeting potential customers out of the entire consuming base. Therefore, external validation may be conducted to test whether the resulting integrated data set is helpful in targeting the customers that will result in a successful sale.

In an example, the sales results from a market campaign is used as external data (i.e., within a campaign, there is a group of customers who are contacted and sold a certain product). In external validation, the external variable is used as the targeting variable and all available variables in the raw dataset are used to develop a response model for sales.

If the dataset is not enriched (e.g., the raw dataset A described herein), a response model is developed using all the raw variables $x_i$, i∈(1, m). Kolmogorov-Smirnoff (K-S) Statistic may be used to evaluate the model efficiency by increasing both the number of fused variables and common variables. By increasing the additional information from dataset B through the fusion algorithm and the number of common variables between two sets of data, the improvement achieved by using the data transmission and fusion techniques described herein becomes more effective.

TABLE 9

| # of common var | # of var in total | | K-S Statistic | | % Improved |
|---|---|---|---|---|---|
| | Rawdata | Fused data | Rawdata | Fused data | |
| 1 | 6 | 10 | 6.5% | 9.0% | 38.9% |
| 2 | 6 | 10 | 6.5% | 8.9% | 37.3% |
| 4 | 9 | 14 | 8.9% | 14.2% | 60.1% |
| 6 | 9 | 14 | 8.9% | 14.8% | 65.8% |

The systems and methods described herein are illustrated by the following example. A data set A contains four types of information: height, weight, age and gender. A data set B contains three types of information: income, age, gender. The goal is to create a data set C containing five types of information: height, weight, income, age and gender. The assignment of the values of income to data set A should be highly trustable.

A data set C is obtained in the following manner. In a first series of steps, the available data is defined. Age and gender appear both in data sets A and B. Age and gender and thus common information. Height and weight only appear in data set A and are, thus, exclusive information for A (EIA). Likewise, income is exclusive information for B (EIB).

In a second series of steps, prediction and classification are carried out. In particular, a multiple regression model is developed on data set A setting common information (namely, age and gender) as independent variables and EIAs as dependent variables. The same is done to data set B. Criteria are then applied to the prediction result generated by the models and all the observations in data set A and data set B are classified into two parts: "reasonable" observations, which contains the well-predicted observations, and "outlier" observations, which contains the remaining observations.

In a third series of steps, data binning is performed. In connection with data binning, all the outlier observations are dropped. The range of common information is split into several intervals. In this example, the range of age is split into, e.g., young-[0, 30), medium-[30, 65) and old-above or equal to 65. The range of gender is split into male and female. Since all the observations uniquely belong to one of the combination of intervals, that is, young male, young female, medium male, medium female, old male and old female, then each of the combination of intervals contains a certain number of observations and there is no intersection between them. In a fourth series of steps, merging is performed to create data set C. In connection with merging, the observations in data set B, in young female, for instance, are assigned to the observations in data set A, in young female. The same is done for every combination of intervals. The resulting data set C contains height, weight, age, gender and income.

Figure 2A:
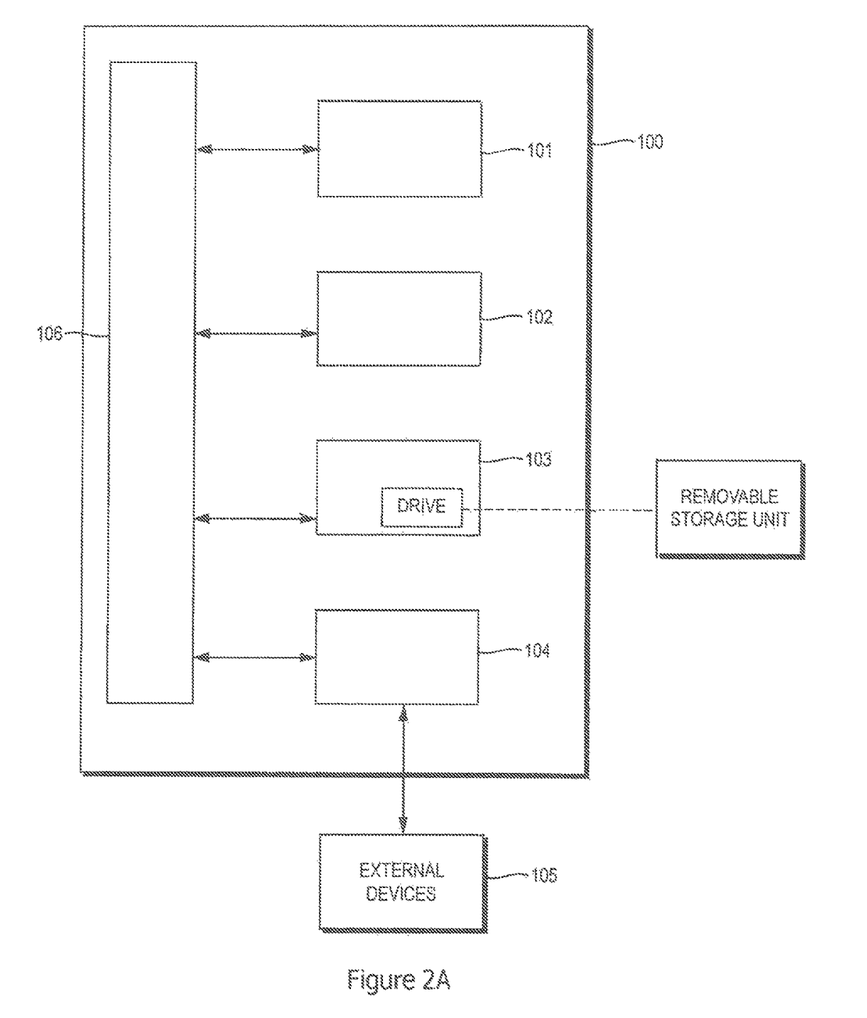
FIG. 2A is a diagram illustrating an exemplary computer system for carrying out embodiments of the present invention and FIGS. 2B and 2C together are a flow chart illustrating an exemplary method of the present invention.

An exemplary computer system, including computer hardware, which may be used to implement the methods of the present invention is now described with reference to FIG. 2A. One skilled in the art will recognize that the described architecture is exemplary only and variations on the system described below can be used within the scope of the present invention.

Computer system 100 comprises hardware, as described more fully herein, that is used in connection with executing software/computer programming code (i.e., computer readable instructions) to carry out the steps of the methods described herein.

Computer system 100 includes one or more processors 101. Processor 101 may be any type of processor, including but not limited to a special purpose or a general-purpose digital signal processor. Processor 101 may be connected to a communication infrastructure 106 (for example, a bus or network). Various software implementations are described in terms of this exemplary computer system. After reading this description, it will become apparent to a person skilled in the art how to implement the invention using other computer systems and/or computer architectures.

Computer system 100 also includes one or more memories 102, 103. Memory 102 may be random access memory (RAM). Memory 103 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 103 may include other similar means for allowing computer programs or other instructions to be loaded into computer system 100. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 100. Alternatively, the program may be executed and/or the data accessed from the removable storage unit, using the processor 101 of the computer system 100.

Computer system 101 may also include a communication interface 104. Communication interface 104 allows software and data to be transferred between computer system 100 and external devices. Examples of communication interface 104 may include a modem, a network interface (such as an Ethernet card), and a communication port, by way of example. Software and data transferred via communication interface 104 are in the form of signals, which may be electronic, electromagnetic, optical, or other signals capable of being received by communication interface 104. These signals are provided to communication interface 104 via a communication path 105. Communication path 105 carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 100. However, these terms may also include signals (such as electrical, optical or electromagnetic signals) that embody the computer program disclosed herein.

Computer programs are stored in memory 102 and/or memory 103. Computer programs may also be received via communication interface 104. Such computer programs, when executed, enable computer system 100 to implement the present invention as discussed herein. Accordingly, such computer programs represent controllers of computer system 100. Where the invention is implemented using software, the software may be stored in a computer program product and loaded into computer system 100 using removable storage drive, hard disk drive, or communication interface 104, to provide some examples.

The invention is implemented using a computer system specially programmed with computer readable instructions to carry out the methodology, as described further herein. As will be understood to those skilled in the art, use of a computer is essential to carry out the methodology. For example, as described herein, the methodology involves merging two sets of observations. In connection with the merging process, random sampling is employed. Random sampling requires a computer to match two sets of observations, according to the rules described, randomly. The randomness will maintain the reliability of the merged dataset. In particular, if two datasets are merged using a matching performed manually, subjectivity will be introduced into the process.

Further, as described elsewhere herein, the methodology relies on the common variables between two sets of data (e.g., dataset A and dataset B) as a bridge to transmit the information from one dataset to another. The bridge developed by the common variables can be considered to be like an electrical conductor and are referred to as transmission variables. The potential energy is then created by the propensity modeling and cluster analysis which allows the entire record to be moved over the wire and classified. The amount of fusion potential (voltage in electrical terms) depends on the strength of the propensity modeling and cluster analysis. Since this process of moving data over a transmission variable instead of electricity over a copper wire only exists and was created in the virtual world, it creates the necessity of using an electronic computer. There is no physical world approach to this problem. In this case, the computer including its components can also be thought of in terms of electrical distribution and control equipment although in this case it improves the control and distribution of fused variables. Employing the methodology described herein improves the efficiency of computing science itself by enabling a more efficient and effective use of data to solve vexing business problems by allowing it to be linked together via fusion.

Figure 2B:
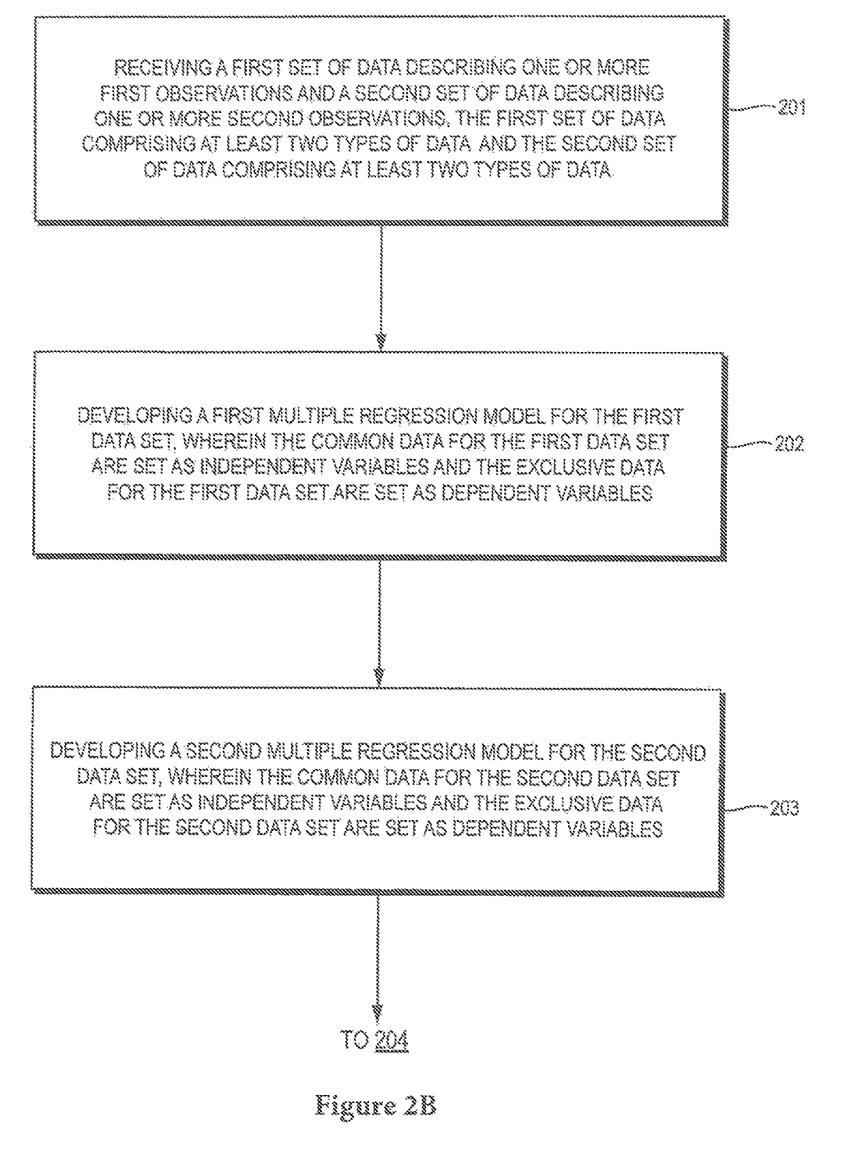
Figure 2C:
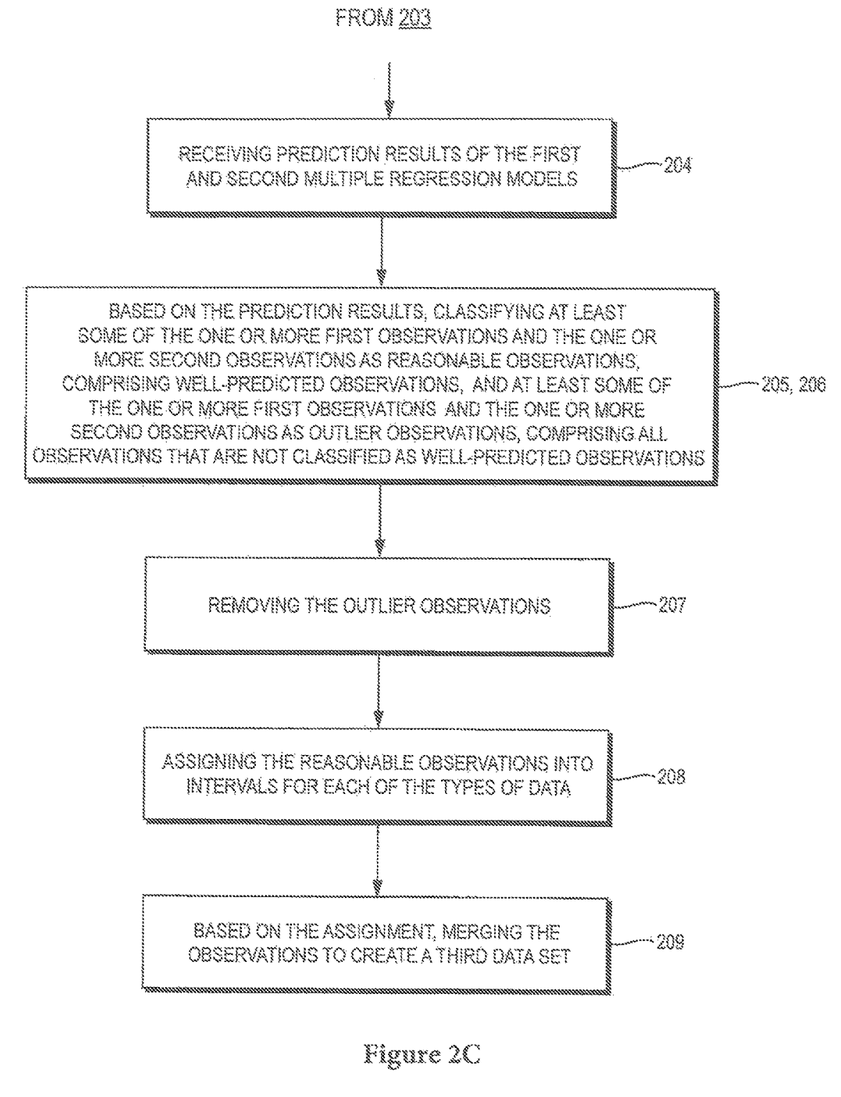

FIGS. 2B and 2C, together, illustrate an exemplary method of the present invention. In step 201, a first set of data describing one or more first observations and a second set of data describing one or more second observations is received. The first set of data comprises at least two types of data and the second set of data comprises at least two types of data. At least one of the two types of data in the first data set are common with at least one of the two types of data in the second data set. The common types of data comprise common data to the first and second sets of data. The types of data that are not common comprise exclusive data for each of the first and second sets of data. A first multiple regression model is developed for the first data set, in step 202. The common data for the first data set are set as independent variables and the exclusive data for the first data set are set as dependent variables. A second multiple regression model is developed for the second data set, in step 203. The common data for the second data set are set as independent variables and the exclusive data for the second data set are set as dependent variables. Prediction results of the first and second multiple regression models are received, in step 204. Based on the prediction results, at least some of the one or more first observations and the one or more second observations are classified as reasonable observations, which are well-predicted observations, in step 205. At least some of the one or more first observations and the one or more second observations are classified as outlier observations, which are not classified as well-predicted observations, in step 206. The outlier observations are removed, in step 207. The reasonable observations are assigned into intervals for each of the types of data, in step 208. Based on the assignment, the observations are merged to create a third data set, in step 209.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer-implemented method comprising:
receiving a first set of data describing one or more first observations and a second set of data describing one or more second observations, the first set of data comprising at least two types of data and the second set of data comprising at least two types of data,
   wherein at least one of the two types of data in the first data set are common with at least one of the two types of data in the second data set, wherein the common types of data comprise common data to the first and second sets of data and the types of data that are not common comprise exclusive data for each of the first and second sets of data;
developing a first multiple regression model for the first data set, wherein the common data for the first data set are set as independent variables and the exclusive data for the first data set are set as dependent variables;
developing a second multiple regression model for the second data set, wherein the common data for the second data set are set as independent variables and the exclusive data for the second data set are set as dependent variables;
receiving prediction results of the first and second multiple regression models;
based on the prediction results, classifying at least some of the one or more first observations and the one or more second observations as reasonable observations, comprising well-predicted observations, and at least some of the one or more first observations and the one or more second observations as outlier observations, comprising all observations that are not classified as well-predicted observations;
removing the outlier observations;
assigning the reasonable observations into intervals for each of the types of data; and
based on the assignment, merging the observations to create a third data set.

2. A system comprising:
memory operable to store at least one program;
at least one processor communicatively coupled to the memory, in which the at least one program, when executed by the at least one processor, causes the at least one processor to perform a method comprising:
receiving a first set of data describing one or more first observations and a second set of data describing one or more second observations, the first set of data comprising at least two types of data and the second set of data comprising at least two types of data,
   wherein at least one of the two types of data in the first data set are common with at least one of the two types of data in the second data set, wherein the common types of data comprise common data to the first and second sets of data and the types of data that are not common comprise exclusive data for each of the first and second sets of data;
developing a first multiple regression model for the first data set, wherein the common data for the first data set are set as independent variables and the exclusive data for the first data set are set as dependent variables;
developing a second multiple regression model for the second data set, wherein the common data for the second data set are set as independent variables and the exclusive data for the second data set are set as dependent variables;
receiving prediction results of the first and second multiple regression models;
based on the prediction results, classifying at least some of the one or more first observations and the one or more second observations as reasonable observations, comprising well-predicted observations, and at least some of the one or more first observations and the one or more second observations as outlier observations, comprising all observations that are not classified as well-predicted observations;
removing the outlier observations;
assigning the reasonable observations into intervals for each of the types of data; and
based on the assignment, merging the observations to create a third data set.

3. A non-transitory computer readable storage medium having stored thereon computer-executable instructions which, when executed by a processor, perform a method comprising:
receiving a first set of data describing one or more first observations and a second set of data describing one or more second observations, the first set of data comprising at least two types of data and the second set of data comprising at least two types of data,
   wherein at least one of the two types of data in the first data set are common with at least one of the two types of data in the second data set, wherein the common types of data comprise common data to the first and second sets of data and the types of data that are not common comprise exclusive data for each of the first and second sets of data;
developing a first multiple regression model for the first data set, wherein the common data for the first data set are set as independent variables and the exclusive data for the first data set are set as dependent variables;
developing a second multiple regression model for the second data set, wherein the common data for the second data set are set as independent variables and the exclusive data for the second data set are set as dependent variables;
receiving prediction results of the first and second multiple regression models;
based on the prediction results, classifying at least some of the one or more first observations and the one or more second observations as reasonable observations, comprising well-predicted observations, and at least some of the one or more first observations and the one or more second observations as outlier observations, comprising all observations that are not classified as well-predicted observations;

removing the outlier observations;

assigning the reasonable observations into intervals for each of the types of data; and based on the assignment, merging the observations to create a third data set.

\* \* \* \* \*